(12) United States Patent
Uebelacker

(10) Patent No.: US 9,126,519 B2
(45) Date of Patent: Sep. 8, 2015

(54) WEATHERPROOF SEAT FOR RECREATIONAL VEHICLES

(75) Inventor: Roland Uebelacker, Pfreimd (DE)

(73) Assignee: Grammar AG, Amberg (DE)

( * ) Notice: Subject to any disclaimer, the term of this patent is extended or adjusted under 35 U.S.C. 154(b) by 575 days.

(21) Appl. No.: 13/091,825

(22) Filed: Apr. 21, 2011

(65) Prior Publication Data

US 2011/0266857 A1    Nov. 3, 2011

(30) Foreign Application Priority Data

Apr. 29, 2010 (DE) .......................... 10 2010 018 822

(51) Int. Cl.
B60N 2/70 (2006.01)
B60N 2/68 (2006.01)

(52) U.S. Cl.
CPC ............... *B60N 2/7011* (2013.01); *B60N 2/68* (2013.01)

(58) Field of Classification Search
USPC ............. 297/452.12, 452.15, 452.16, 452.13
See application file for complete search history.

(56) References Cited

U.S. PATENT DOCUMENTS

| 3,041,109 | A | * | 6/1962 | Eames et al. | 297/451.4 |
| 5,507,563 | A | * | 4/1996 | Arthur, Jr. | 297/440.23 |
| 5,716,101 | A | * | 2/1998 | Frinier et al. | 297/440.22 |
| 5,762,403 | A | * | 6/1998 | Robinson | 297/440.11 |
| 5,911,478 | A | * | 6/1999 | Goodman | 297/440.11 |
| 6,733,084 | B2 | * | 5/2004 | Butler | 297/452.56 |
| 7,040,834 | B2 | * | 5/2006 | Nardi | 403/329 |
| 2006/0103222 | A1 | * | 5/2006 | Caruso et al. | 297/452.15 |
| 2008/0284229 | A1 | * | 11/2008 | Masunaga et al. | 297/452.18 |

FOREIGN PATENT DOCUMENTS

| AT | 321497 | 4/1975 |
| AT | 502289 | 2/2007 |
| DE | 69500828 | 4/1998 |
| DE | 20307102 | 10/2003 |
| DE | 60111458 | 5/2006 |
| DE | 60116924 | 11/2006 |

OTHER PUBLICATIONS

Official Action for German Patent Application No. 102010018822.0 dated Jan. 31, 2013, 3 pages.
Official Action for German Patent Application No. 102010018822 dated Aug. 9, 2011, 5 pages.

* cited by examiner

*Primary Examiner* — David R Dunn
*Assistant Examiner* — Timothy J Brindley
(74) *Attorney, Agent, or Firm* — Sheridan Ross P.C.

(57) ABSTRACT

The invention relates to a vehicle seat for open or semi-open motorized recreational vehicles, such as riding mowers, golf carts, buggies or the like, in which a seat part and a backrest are formed together in one piece, wherein the seat part and the backrest have a common base structure and at least one net-like fabric stretched over the latter and the net-like fabric is formed as a possible contact face for a person who is sitting on the seat, wherein the net-like fabric is weatherproof and is designed in such a way that it is more extensible in a longitudinal direction of the vehicle seat than in a width-wise direction of the vehicle seat.

18 Claims, 6 Drawing Sheets

WEATHERPROOF SEAT FOR RECREATIONAL VEHICLES

The present application claims the benefits of German Application Serial No. 10 2010 018 822.0 entitled "Weatherproof seat for recreational vehicles", filed Apr. 29, 2010, which is incorporated herein by reference in its entirety.

The invention relates to a vehicle seat for open or semi-open motorized recreational vehicles, such as riding mowers, golf carts, buggies or the like, in which a seat part and a backrest are formed together in one piece, the seat part and the backrest having a common base structure and at least one net-like fabric stretched over the latter and the net-like fabric being formed as a possible contact face for a person who is sitting on the seat, the net-like fabric being weatherproof and being designed in such a way that it is more extensible in a longitudinal direction of the vehicle seat than in a width-wise direction of the vehicle seat.

Vehicle seats are usually designed to be used for several hours at a stretch and should make sitting a comfortable and pleasant experience for the occupant of the vehicle during this time. These vehicle seats are therefore designed in a very complicated manner and as a result are very expensive. In particular, in the case of vehicles and accordingly also for the seats thereof, which are used for activities in the open air during leisure time, completely different demands are set.

In the field of recreation, vehicles such as riding mowers, golf carts, buggies etc. are used only for a short time. Even if these vehicles are used for a longer period, as a rule the vehicle is repeatedly left in relatively short intervals. A very good example of this is golf carts, which are regularly left. Riding mowers, too, are regularly left, in order to carry out other activities involved with cutting a lawn such as removing rubbish and stones, dealing with areas not accessible to the riding mower and similar tasks.

On account of these interruptions the demand—usually made upon vehicle seats—of lasting sitting comfort for recreational vehicles is of secondary importance. Furthermore, additional comfort elements, such as armrests or the like, are likewise not required and are frequently even not desired since they obstruct rapid boarding and alighting.

These vehicles are frequently used in the open air for a prolonged period and in widely varying weather conditions. Since the vehicles are generally designed to be open or at least semi-open, the vehicle seats are also exposed to these widely varying weather conditions with virtually no protection. In some cases the vehicles even remain with no protection in the open when not in use. This sets particularly high demands upon the strength of the vehicle seats.

Since they are used in the private hobby and recreational field it is preferable that recreational vehicles of this type can be supplied as inexpensively as possible. It is therefore desirable that individual components such as the vehicle seat should also be designed to be as simple and as inexpensive as possible, without having to put up with unacceptable losses in quality. Even in the case where use occurs for a short time, the user expects a minimum degree of sitting comfort.

The object of the present invention is therefore to make available a weatherproof vehicle seat for open or semi-open motorized recreational vehicles, such as riding mowers, golf carts, buggies or the like, which is inexpensive to produce and which has a degree of sitting comfort.

This object is attained according to the features of claim 1.

An essential subject of the invention consists in a vehicle seat for open or semi-open motorized recreational vehicles, such as riding mowers, golf carts, buggies or the like, in which a seat part and a backrest are formed together in one piece, the seat part and the backrest having a common base structure and at least one net-like fabric stretched over the latter and the net-like fabric being formed as a possible contact face for a person who is sitting on the seat, the net-like fabric being weatherproof and being designed in such a way that it is more extensible in a longitudinal direction of the vehicle seat than in a width-wise direction of the vehicle seat. Such a vehicle seat according to the invention is particularly inexpensive, since movable elements such as for example a mechanism for adjusting the backrest with respect to the seat face is omitted.

The net-like fabric of this type lets through air and rainwater. This makes the vehicle seat only slightly vulnerable to wind and rain. In addition, the use of the net-like fabric also allows the breathing of the skin and the movement of air, moisture and warmth through the fabric during use. In this way, it is possible for air, moisture and warmth to be supplied and removed even on the contact faces of the seat with the person sitting on the seat, and this provides a pleasant sitting sensation and prevents increased formation of perspiration.

The base structure is preferably designed in such a way that it has rounded corners and edges which impart a modern appearance to the vehicle seat on the one hand and also reduce the risk of injury to the persons sitting on the seat, such as for example by cuts at sharp edges and corners, on the other hand.

In a preferred embodiment of the vehicle seat the base structure is designed in the form of a seat shell of plastics material which is closed at least in part and which can have openings through which water is capable of flowing off. A seat shell of this type forms the frame over which the net-like fabric is stretched. The design of the base structure in the form of a seat shell is advantageous in many respects. In this way, it is possible for seat shells to be produced rapidly and inexpensively. Depending upon requirements, the material, the thickness of material, the shape and other parameters can be adapted. During use, the design of the vehicle seat according to the invention with a seat shell affords the advantage that in this way the side of the net-like fabric facing away from the person sitting on the vehicle seat is protected from dirt and moisture. In this way, for example, spray water is kept off the net-like fabric and thus the diffusion of moisture through the net-like fabric to the person sitting on the vehicle seat is prevented.

In is advantageous for the seat shell to be produced from plastics material. Other materials, such as for example sheet metal, however, are also possible. In contrast to other materials, plastics material has the advantage that it is possible for seat shells to be produced from plastics material in a simple and inexpensive manner. The material costs in the normal case are likewise lower than in the case of comparable structures of metal. Seat shells of plastics material afford the additional advantage that, whilst having a comparable stability, they are significantly lighter than seat shells of metal, and this is advantageous in the case of the relatively low overall weight of the recreational vehicles and the low motor power thereof. In addition, the weather resistance of plastics materials is advantageous.

The use of seat shells entails the risk that moisture will accumulate in depressions. By way of example, rainwater passing through the net-like fabric can accumulate in the seat shell. In order to prevent this, the seat shell of the vehicle seat preferably has openings through which the water can flow off.

In a further preferred embodiment of the vehicle seat the base structure is designed in the form of a tube frame. This tube frame preferably extends along the boundaries of the seat. It is preferable for it to be produced from metallic tubes which are bent and connected to one another in such a way that they assume the external shape of the vehicle seat. Other materials such as plastics material, however, are also possible. Apart from the front brace member and the upper bounding brace member, it is preferable for the tube frame to have no further brace members in the seat region or the back region. Brace members of this type, however, can also be used to ensure adequate stability for example in the case where particularly thin tubes are used for the lateral and/or upper and/or front boundary tubes. In this case the brace members can be of the same material as the outer frame boundaries or of different materials. The brace members can assume any suitable cross-sectional geometry. Round, triangular, U-shaped or L-shaped cross-sections are preferred, but rectangular, hexagonal or other cross-sections are also possible. It is preferable for the brace members to extend in the width-wise direction between the lateral boundaries of the tube frame. However, other orientations are also possible. By way of example, the brace members can extend obliquely over the planes forming the backrest or the seat face. In this case it is also possible for a plurality of brace members to intersect.

A design of the base structure in the form of a tube frame has the advantage that the material requirement is reduced as compared with seat shells. In this way, savings in terms of cost and weight are possible. In addition, the possibility of articles or liquids accumulating between the net-like fabric and the seat shell is prevented. A further advantage is that the side of the net-like fabric facing away from the person sitting on the vehicle seat is more easily accessible to the surrounding air and so air, moisture and warmth can be removed through the fabric in an improved manner.

When a tube frame is used as a base structure it is additionally advantageous if the tube frame is surrounded at least in part by sewn-round edge regions of the net-like fabric. With this very simple possibility of joining the tube frame and the net-like fabric, parts of the tube frame are passed through edge regions of the net-like fabric which are joined to themselves in the manner of a loop. In order to form the loop-like joints, the edges of the net-like fabric can be folded in for example and can be joined by sewing to the regions of the net-like fabric which are then situated under them. As well as sewing, other possibilities of joining are also possible. By way of example, the edge regions can be shaped to form loops by adhesion, clamping, thermal welding or the like. No further fastening elements are necessary when joining the tube frame and the net-like fabric by way of loops of this type, so that a very simple and inexpensive joint is possible. In addition, with this type of joint it is possible in a very simple manner for regions in which a relatively high degree of stressing is present to be produced in the net-like fabric by the positioning of the loop-like joints. As a result, it would be possible for example for the zone of the net-like fabric in which the lumbar region of the person sitting on the vehicle seat is situated to be additionally stabilized.

In order to combine the advantages both of a seat shell and of a tube frame, it is provided in a preferred embodiment of the vehicle seat that the tube frame is capable of being inserted into a seat shell. In this way, the simple joints between the net-like fabric and the tube frame can be combined with the advantages of a seat shell.

A further preferred variant of design of the base structure of the vehicle seat provides that the base structure is designed in the form of lateral elements preferably of plastics material which are spaced apart from one another by at least one spacer member. In this case the lateral elements are preferably designed in an L shape, so that they impart the desired shape to the vehicle seat. In this case the longer arm of the L shape forms the backrest. However, other designs are also possible, in which a very short backrest is intended to support only the lumbar region of the person sitting on the vehicle seat, and this permits a significantly reduced overall height of the recreational vehicle. In this case the arms of the L-shaped lateral elements need not necessarily form angles of 90°, but can form angles of between 60° and 150°. It is preferable for the arms to be designed in such a way that the region in which the arms meet is arched, so that after being covered with the net-like fabric this region supports the posterior region of the person sitting on the vehicle seat.

The spacer members arranged between the lateral elements are preferably arranged in regions of the vehicle seat which are subject to particular stress, in order to ensure sufficient stability there. It is preferable for at least one spacer member to be present in the seat part and for at least one spacer member to be present in the backrest of the vehicle seat. No spacer member is preferably arranged in the posterior region, since on account of the particularly high stressing it would be possible for the net-like fabric to be stretched there in such a way that the person sitting on the vehicle seat would come into contact with the spacer member, and this would reduce the seating comfort. If spacer members are required in this region, they are preferably made arched in the longitudinal extension thereof in such a way as to make contact of a person sitting on the vehicle seat with them unlikely.

In this case the spacer members can be of the same material as the outer lateral elements or of a different material. The spacer members preferably have round, triangular, U-shaped or L-shaped cross-sectional geometries, but rectangular, hexagonal or other cross-sectional geometries are also possible. It is preferable for the brace members to extend in the width-wise direction between the lateral boundaries of the tube frame. However, other orientations are also possible. By way of example, the brace members can extend obliquely over the planes forming the backrest or the seat face. In this case it is also possible for a plurality of brace members to intersect.

In a manner similar to a tube frame, the embodiment with lateral elements spaced apart from one another by spacer members affords the advantages that the possibility of articles or liquids accumulating between the net-like fabric and the seat shell is prevented, as well as the easy accessibility of the side of the net-like fabric facing away from the person sitting on the vehicle seat to the surrounding air and the associated improved removal of air, moisture and warmth. In addition, such a variant of design simplifies the covering with the net-like fabric. The fabric can be joined to the lateral elements without stressing and can be subsequently set to the desired stressing by the introduction of the spacer members.

In a vehicle seat according to the invention it is advantageous for the lateral elements and/or the at least one spacer member to be produced from plastics material. In this way, it is possible for the lateral elements to be produced in a simple and advantageous manner in large piece numbers, and for the necessary stability to be provided at the same time as a low weight.

The net-like fabric is advantageously designed in the form of a wide-mesh fabric in which a strand of fabric is at a distance of more than 2 mm from the next parallel strand of fabric in at least one direction. This embodiment ensures that on the one hand the net-like fabric is sufficiently thick to withstand the pressure stressing which occurs during the use of the vehicle seat. On the other hand, this wide-mesh design ensures that air, moisture and heat can pass through the fabric. Depending upon the material used, it is possible that further distances may be necessary between individual strands of fabric in order to allow rainwater for example to flow off completely. In this context, net-like fabrics are to be taken to mean not only woven textile materials. Net-like fabrics are rather to be regarded as being any fiber composites which are joined to one another in any desired manner so that they can cover the area bounded by the base structure of the vehicle seat. It is also possible for example for individual threads to be stretched as the seat face between the base structure in such a way that they are not joined to one another, are joined only loosely or are joined only separately. In the same way, knotted strands of fibers are also possible which for example form square or, in particular, hexagonal intermediate spaces.

In the same way it is possible for the net-like fabric to be produced with a plurality of layers. As a result, different material characteristics of various layers of fabric can be combined. In this way, it is possible, for example, for specific regions of the vehicle seat to be stabilized in a particular manner by a multiple-layer design of the net-like fabric for example. In the same way it is possible for example for one of the layers to be an upholstered material. Open-celled cut foam or any other suitable upholstered material could be used for example as the upholstered material of this type. As a result of this design it is possible for specific regions of the vehicle seat to be upholstered in a particular manner and thus for the sitting comfort to be increased. By way of example, the seat face and/or the lumbar region can be made more comfortable as a result. A softer fitting behavior, a better pressure distribution and possibly also improved aeration can be achieved in this way.

In order to prevent slipping of the individual layers with respect to one another in the case of a multiple-layer design of the net-like fabric, the layers can be joined to one another in a flat or point-wise manner. This is possible for example by sewing and/or welding. In the same way it is possible for the individual fabric layers to be fastened jointly or separately to the frame structure of the vehicle seat. The individual methods of fastening the net-like fabric to the frame structure of the vehicle seat are described in greater detail below. All these methods are likewise capable of being applied even in the case of a multiple-layer design of the net-like fabric.

A preferred embodiment of the vehicle seat is characterized in that the net-like fabric comprises natural fibers such as wool, cotton, silk, rubber or the like and/or the net-like fabric comprises organic or inorganic artificial fibers such as polyester, polyamide, polyacrylonitrile, polyimide, polyethylene, polypropylene, polytetrafluoroethylene, polyurethane, aramide, glass fibers, basalt fibers, carbon fibers or the like and/or the net-like fabric comprises at least one metallic fiber such as a metallic wire. In this case aramide fibers can act as cut-protection fibers. Substances both of natural fibers and of organic or inorganic artificial fibers are widespread and are relatively favourable. Depending upon their nature and preparation they are highly resilient. In this case artificial fibers have the advantage as compared with natural fibers that their characteristics can be influenced by the production method and that precisely defined material characteristics are capable of being achieved. By the selection and/or the combination of artificial fibers which are adapted to the current requirements, an inexpensive and easy design of the net-like fabric is possible. Combinations of organic or inorganic artificial fibers with natural fibers are also possible. In addition, metallic fibers such as for example a metal wire as well as combinations thereof with other fibers are also possible. As compared with more greatly extensible organic or inorganic artificial fibers and natural fibers, a design of this type has less seating comfort, but it has the advantage of a very good durability and weather resistance which is also utilized for example in the case of park benches and seats at bus, train and urban railway stops.

It is advantageous for the net-like fabric to be joined to the base structure by means of projections, in which case it is preferable for the projections to be designed in the form of pins, hooks, eyelets, needles or nails. In this case the projections are preferably joined to the base structure in a fixed manner. The comparatively large interspaces in the structure of the net-like fabric make it possible for fastening elements in the form of projections to be passed through the net-like fabric in a simple manner and for the latter to be fastened to the base structure in this way and to be held at the same time at the desired tensioning. It is preferable for the fastening elements to be projections which are designed in the form of pins, hooks, eyelets, needles or nails. These projections can be joined to the base structure before the application of the net-like fabric or can be used only after the application of the net-like fabric. It is possible for example for the net-like fabric to be produced whilst incorporating the projections and for fiber strands in the edge regions to be passed through eyelets arranged on the base structure or around pins or hooks.

In addition, it is possible for the fabric to be produced separately and subsequently to be stretched over the frame. It can then be fastened to the latter by means of pins or nails for example. A simple possibility consists in fastening by means of staples which are introduced through the fabric into the base structure by means of a tacker, also a hammer tacker or an electric tacker. It has likewise been found to be an advantageous possibility that the fabric can also be stretched by way of pins or hooks already connected to the base structure and is joined to the base structure when lowered onto the pins or hooks. On account of the relatively large meshes of the net-like fabric, this is particularly simple. In some special cases of artificial fibers, adhesion or welding (for example by means of ultrasound) of the net-like fabric to the base structure is possible. In the case of a metallic fabric, welding is also possible, depending upon the base structure.

A further advantageous variant of the joint between the net-like fabric and the base structure consists in that the net-like fabric is designed in the form of a hose or sock which is pressed at least in part over the base structure. As a result, it is possible for fastening elements to be substantially avoided. The hose or sock which is pressed over the base structure need only be prevented from slipping.

In a further preferred embodiment the net-like fabric is joined at the edges directly or indirectly to at least one preferably flexible rod with a preferably round cross-section, which is capable of being inserted into at least one guide channel arranged in the base structure. The guide channel preferably has an opening which extends along the longitudinal direction thereof and the width of which is bounded by profiled elements. In this case the width of the opening is selected to be such that, although the net-like fabric can pass through, the rod cannot. In this way the rod and thus also the net-like fabric joined to it are fixed in the guide channel and the net-like fabric acting as the seat or backrest face is held stressed. In a flexible variant it is preferable for the rod to be pressed through an opening in the front region of the base structure into the guide channel in such a way that the net-like fabric joined to it can emerge out of the slot-like opening which extends along the longitudinal extension of the guide channel. It is also possible, however, for the guide channel first to be produced with a wide opening along the longitudinal extension thereof and for the opening to be narrowed later, after the insertion of the rod and thus also of the net-like fabric joined to it, by the insertion of the profiled elements to the extent that the rod cannot emerge through this opening and thus for the net-like fabric to be held in a permanent manner at the desired tensioning. In this variant it is not absolutely necessary for the rod to be made flexible. The rod can be shaped in such a way that it is capable of being inserted without further shaping into the guide channel.

A preferred embodiment is therefore characterized in that the net-like fabric surrounds the rod at least locally and emerges out of the guide channel through an opening which extends at least locally along the longitudinal direction of the guide channel and which is defined in the gap width by profiled elements. It is preferable for the net-like fabric to be passed around the rod and to be sewn onto itself, so that a loop is formed which can receive the rod. In order to cover the base structure with the net-like fabric the rod is inserted into the loop of the net-like fabric and the rod and the net-like fabric are introduced jointly into the guide channel. It is preferable for this to be carried out in such a way that the net-like fabric emerges through the opening defined by the profiled elements and has the desired stressing.

In a further preferred embodiment the net-like fabric is joined to at least one fastening strap which surrounds the rod at least locally and which emerges out of the guide channel through an opening which extends at least locally along the longitudinal direction of the guide channel and which is defined in the gap width by profiled elements. This has the advantage that different materials can be used for the fastening strap than for the net-like fabric. It is thus possible for the forces occurring during the emerging out of the guide channel through the opening defined by the profiled elements to act not upon the wide-mesh fiber bundles of the net-like fabric but upon the fastening strap. The fastening strap is therefore preferably produced from a very hard-wearing material. This can be for example leather or a fabric of artificial or natural fibers.

In a further preferred embodiment the net-like fabric has zones in which it is more extensible in the longitudinal direction and/or in the width-wise direction than in other zones. As a result, it is possible for example for a middle zone to be made somewhat more extensible in the longitudinal direction than the edge regions, and this ensures an improved stability for the person sitting on the vehicle seat. In the same way, an improvement in the seating comfort is possible by differing extensibility in the width-wise direction. As a result, the stressing of the net-like fabric can be adjusted to anatomical characteristics and, for example, the lumbar region of the person sitting on the vehicle seat can be supported by a greater stressing of the net-like fabric in this region.

Further advantages, aims and properties of the present invention are explained with reference to the following description of the accompanying drawings in which vehicle seats according to the invention for open or semi-open motorized recreational vehicles are illustrated by way of example. In this case components of the vehicle seat for open or semi-open motorized recreational vehicles, which in the figures correspond at least substantially in their function, can be designated with the same reference numbers, it being unnecessary for these components to be numbered and explained in all the figures. In the drawings FIG. 1 is a perspective illustration of a base structure designed in the form of a tube frame;

Figure 1:
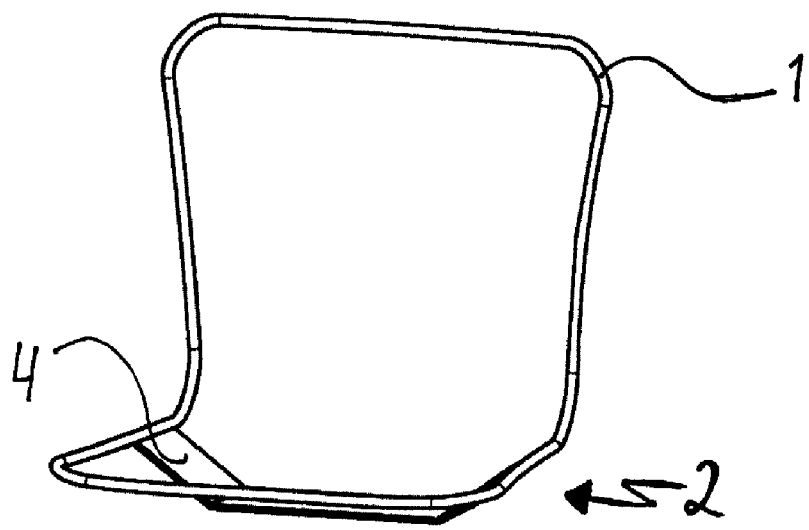

A base structure 2 designed in the form of a tube frame 1 is shown in a perspective illustration in FIG. 1. The tube frame 1 can be formed from individual frame elements. In addition, the base structure 2 has a base part 4 which further stabilizes the tube frame 1 and permits the connection to the vehicle (not shown).

Figure 2:
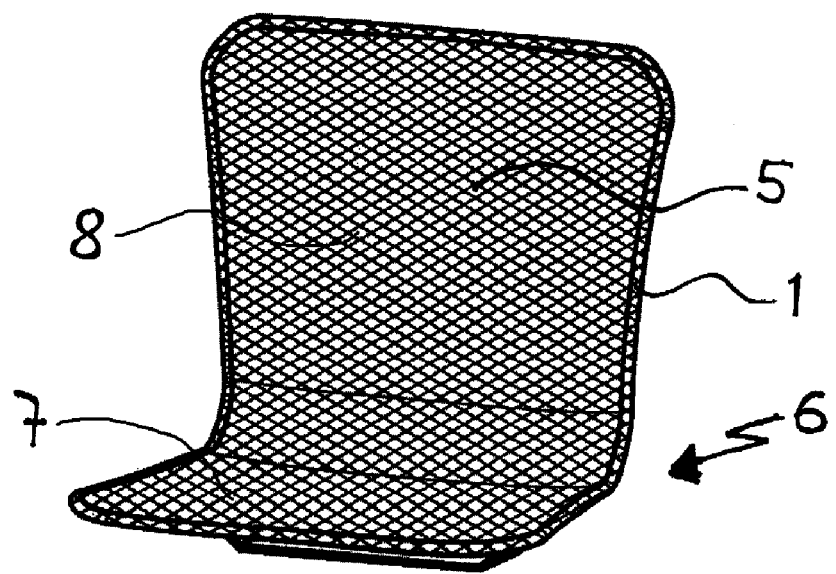
FIG. 2 is a perspective illustration of a tube frame covered with a net-like fabric.

FIG. 2 is a perspective illustration of a tube frame 1 covered with a net-like fabric 5. A vehicle seat 6 of this type has a seat part 7 and a backrest 8 which are formed in one piece. As a result, it can be constructed in a particularly light and simple manner. The joint between the tube frame 1 and the net-like fabric 5 can be carried out in such a way that the individual frame elements are inserted into loops which are formed in the net-like fabric 5 by sewing around the edge region of the latter.

Figure 3:
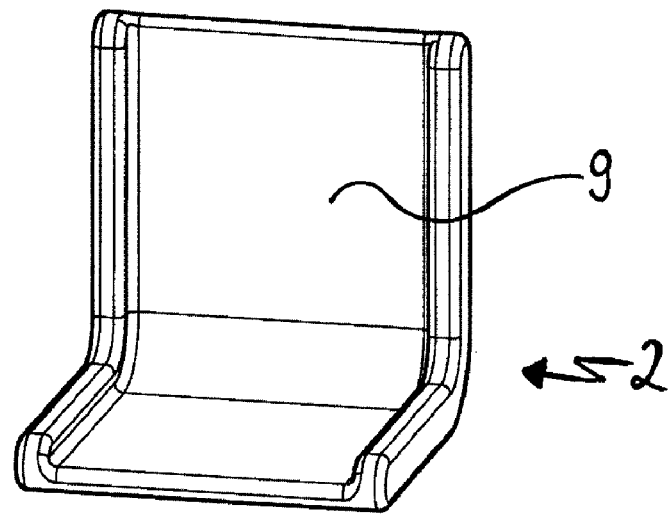
FIG. 3 is a perspective illustration of a base structure designed in the form of a seat shell.

A base structure 2 designed in the form of a seat shell is shown in a perspective illustration in FIG. 3. It comprises merely a seat shell 9 which can receive the net-like fabric or over which the net-like fabric can be stretched. Means (not visible in this view) for connecting the seat shell 9 to the vehicle are arranged on the underside. Around the lower region the seat shell 9 can have openings through which water can flow out. It is also optionally possible for drainage channels, which discharge water laterally out of the seat shell, to extend in the base area, so that the apparatus for connecting the seat shell 9 to the vehicle should not be subjected to moisture to an increased degree.

Figure 4:
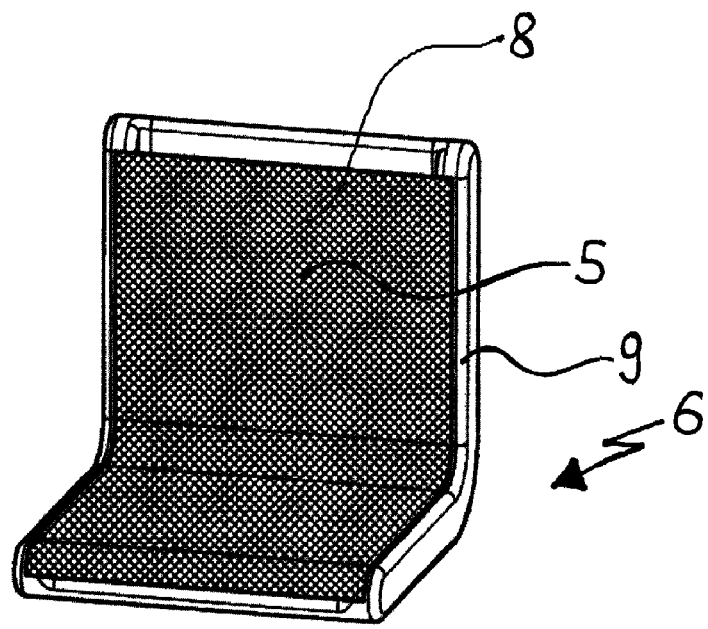
FIG. 4 is a perspective illustration of a seat shell covered with a net-like fabric.

FIG. 4 is a perspective illustration of a seat shell 9 covered with a net-like fabric 5. Despite its low weight, a vehicle seat 6 of this type is relatively robust and it protects the back area 8 of the person sitting on the vehicle seat 6. In this way, dirt and rainwater for example cannot pass to the net-like fabric 5 at the rear or pass through the net-like fabric 5 to the back of the person.

Figure 5:
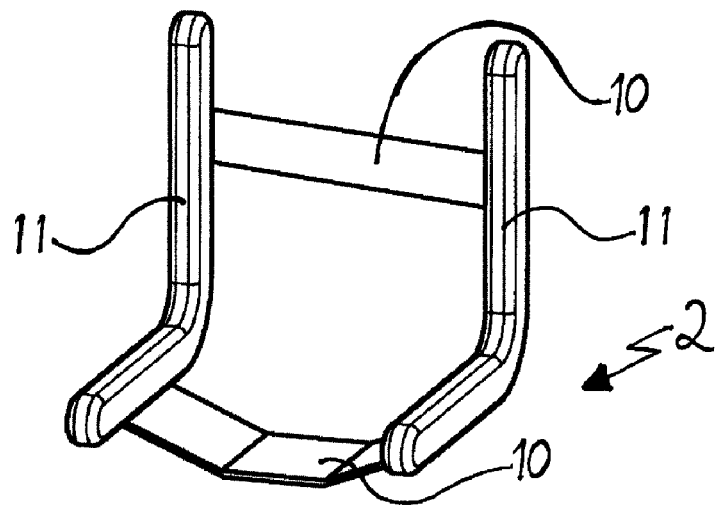
FIG. 5 is a perspective illustration of a base structure which is designed in the form of lateral elements spaced apart from each other by two spacer members.

FIG. 5 is a perspective illustration of a base structure 2 which is designed in the form of lateral elements 11 spaced apart from each other by two spacer members 10. In this case, one of the two spacer members 10 is designed at the same time in the form of a base part.

Figure 6:
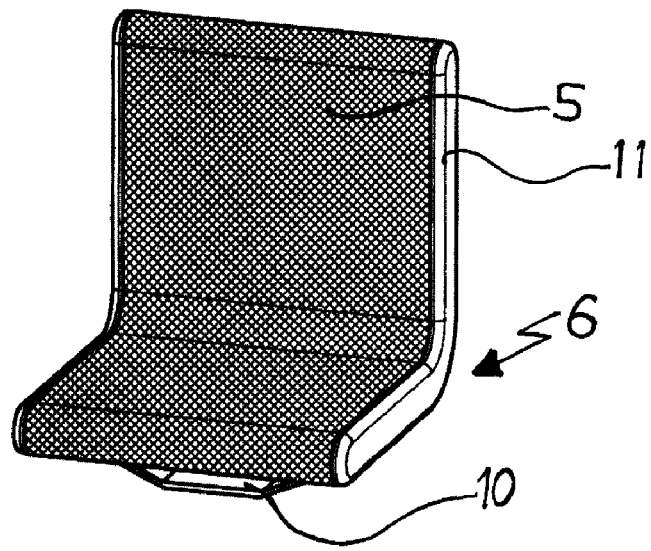
FIG. 6 is a perspective illustration of the base structure as shown in FIG. 5 covered with a net-like fabric.
Figure 7:
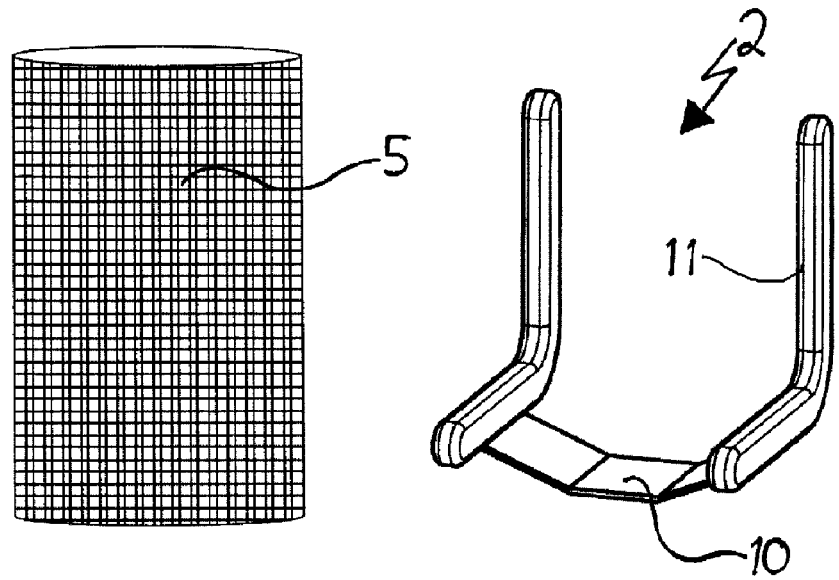
FIG. 7 is a perspective illustration of a base structure which is designed in the form of lateral elements spaced apart from each other by two spacer members, and a diagrammatic illustration of a net-like fabric designed in the form of a hose.

FIG. 6 is a perspective illustration of the base structure shown in FIG. 5 covered with a net-like fabric 5. A vehicle seat 6 of this type is obviously lighter than the design with a seat shell. On account of the lateral elements 11 which are more stable as compared with a tube frame and which are made reinforced, a vehicle seat 6 of this type is particularly advantageous with respect to the expense and the cost of materials. FIG. 7 is a perspective illustration of a base structure 2 which is designed in the form of lateral elements 11 spaced apart from each other by a spacer member 10, and a diagrammatic illustration of a net-like fabric 5 designed in the form of a hose. The net-like fabric 5 shown on the left in this illustration and designed in the form of a hose is designed in terms of the hose diameter in such a way that it can be pulled over the base structure 2 shown on the right in FIG. 7. As a result, further fixing of the net-like fabric 5 is not necessary or is necessary only point-wise. It is advantageous for the net-like fabric 5 drawn over the base structure 2 and designed in the form of a hose merely to be prevented from slipping in the longitudinal direction. This can be carried out by joints to the frame or by sewing the openings.

Figure 8:
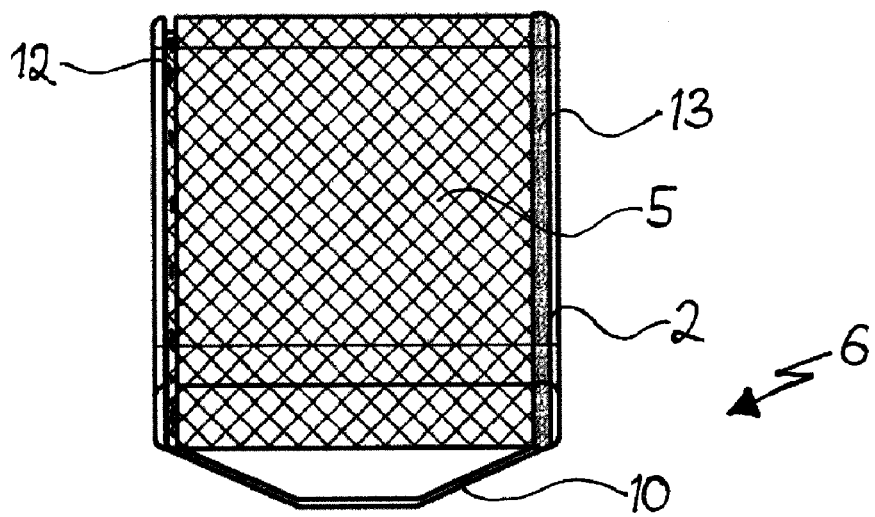
FIG. 8 is a diagrammatic front view of a net-like fabric fixed on the base structure by means of staples and with (on the right) and without (on the left) a covering of the fastening elements.

FIG. 8 is a diagrammatic front view of a net-like fabric 5 fixed on the base structure 2 by means of projections 12 and with (on the right) and without (on the left) a covering 13 of the fastening elements. The projections 12 designed in this special case in the form of staples are used to hold the net-like fabric 5 on the base structure 2 and at the same time to prevent it from slipping. In the case where staples are used, the projections 12 used for fastening the net-like fabric 5 are recessed almost completely into the base structure 2. Other variants such as nails, hooks or eyelets project in part to a significant degree out of the base structure 2. In order to protect the person sitting on the vehicle seat 6 from injury in the event of undesired contact with the projections 12 and in order give the vehicle seat 6 a more attractive visual appearance, the projections 12 are preferably protected by a covering 13.

Figure 9:
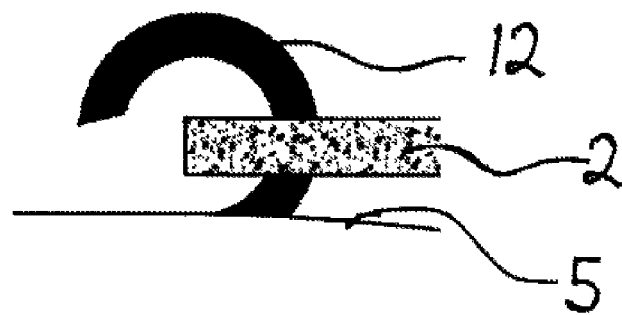
FIG. 9 is a diagrammatic illustration of a fixing of the net-like fabric by means of a hook arranged on the base structure.

FIG. 9 is a diagrammatic illustration of a fixing of the net-like fabric 5 by means of a projection 12 arranged on the base structure 2. The projection 12 designed in this case in the form of a hook is connected to the base structure 2 in a fixed manner. The net-like fabric 5 is stretched and the hook 12 is inserted into intermediate spaces between individual fiber strands of the net-like fabric 5. In this way, the net-like fabric 5 is fixed in a stretched position on the base structure 2. The projections 12 can be protected by covers 13, as shown in FIG. 8.

Figure 10:
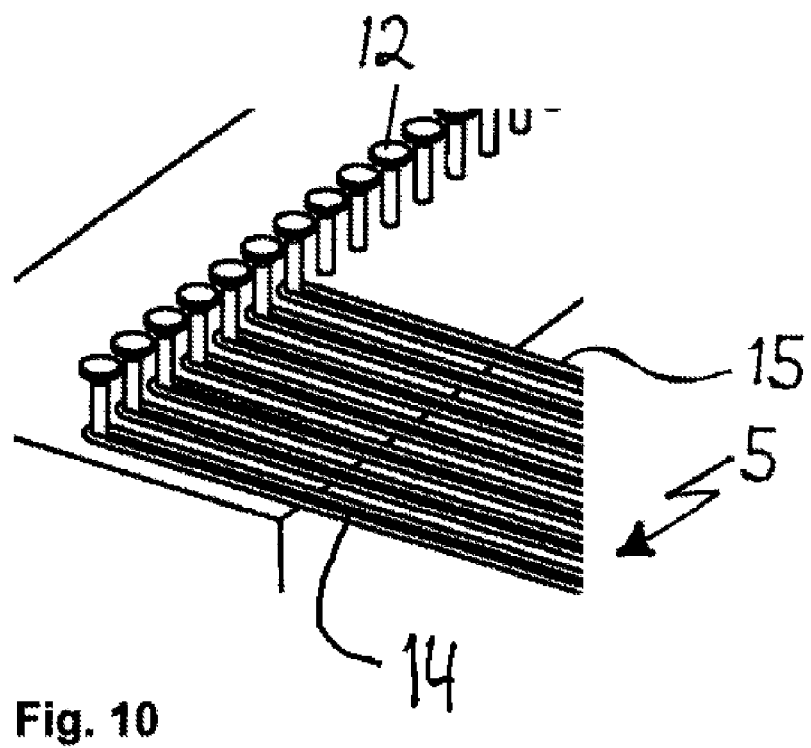
FIG. 10 is a diagrammatic cut-away illustration of a vehicle seat in which the net-like fabric is designed in the form of portions—extending parallel—of a thread guided around projections.

FIG. 10 is a diagrammatic cut-away illustration of a vehicle seat, in which the net-like fabric 5 is designed in the form of portions—extending parallel—of a strand 15 guided around projections 12. In this case too it is possible for the projections 12 to be protected by covers, as shown in FIG. 8. In this embodiment the strand 15 is passed around the projections 12 in such a way as to form a large number of portions 14 which extend parallel and which form a possible contact face with a person sitting on the seat. It is also of course possible for the strand or further strands to be additionally guided around projections and that portions 14 not extending parallel to the first strand 15 should be formed. By way of example, fiber strands can extend at a right angle to one another or can be at a different angle to one another, so that the intermediate spaces formed by these fiber strands represent different geometrical figures such as for example parallelograms or hexagons.

Figure 11:
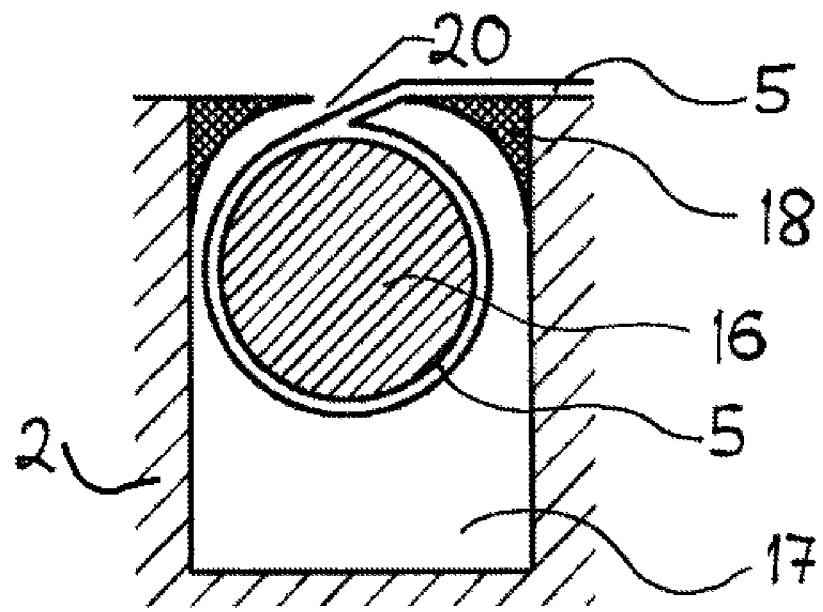
FIG. 11 is a diagrammatic illustration of the joint between the net-like fabric and the base structure by sewing around a flexible rod with the net-like fabric.

FIG. 11 is a diagrammatic illustration of the joint between the net-like fabric 5 and the base structure 2 by sewing around a flexible rod 16 with the net-like fabric 5. The net-like fabric 5 is arranged around the flexible rod 16 and, as a result, is connected to it. The rod 16 and thus also parts of the net-like fabric 5 are situated in a guide channel 17. The rod 16 is secured by profiled strips 18 in the guide channel 17 and cannot emerge through opening 20 situated between the profiled strips 18. It is provided, however, that the net-like fabric 5 emerges between the profiled strips 18 and covers the seat face.

Figure 12:
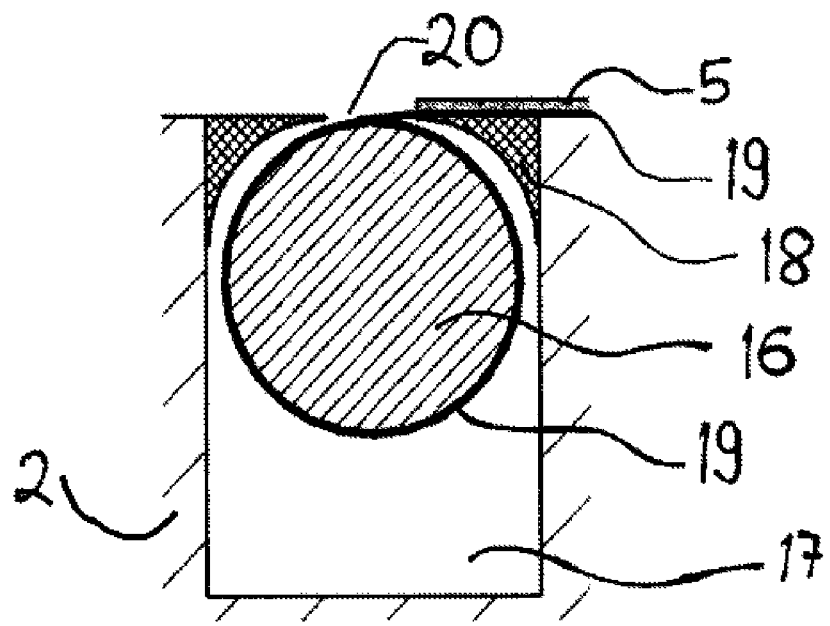
FIG. 12 is a diagrammatic illustration of the joint between the net-like fabric and the base structure by sewing the net-like fabric with a fastening strap connected to a flexible rod.

A diagrammatic illustration of the joint between the net-like fabric 5 and the base structure 2 by sewing the net-like fabric 5 with a fastening strap 19 connected to the flexible rod 16 is shown in FIG. 12. The principle is similar to that shown in FIG. 11. In this embodiment too, the rod 16 is secured by profiled strips 18 in the guide channel 17. In contrast to the embodiment shown in FIG. 11, however, the rod 16 is not directly connected to the net-like fabric 5, but the rod 16 is surrounded at least locally by at least one fastening strap 19 which is connected in turn to the net-like fabric 5. The nature of the joint can be sewing for example.

All the features disclosed in the application documents are claimed as being essential to the invention, insofar as they are novel either individually or in combination as compared with the prior art.

LIST OF REFERENCES 1 tube frame
2 base structure
4 base part
5 net-like fabric
6 vehicle seat
7 seat part
8 backrest
9 seat shell
10 spacer member
11 lateral element
12 projection
13 cover
14 portion
15 strand
16 flexible rod
17 guide channel
18 profiled strip
19 fastening strap
20 opening

The invention claimed is:
1. A vehicle seat, comprising:
a seat part;
a backrest interconnected to the seat part in one piece configuration, which forms a common base structure;
at least one net-like fabric stretched over the backrest, the net-like fabric is formed as a contact face for a person who is sitting on the vehicle seat, wherein the net-like fabric comprises fiber composites joined to one another, wherein the net-like fabric is weatherproof and is designed in such a way that it is more extensible in a longitudinal direction of the vehicle seat than in a width-wise direction of the vehicle seat, and wherein the net-like fabric lets through air and rain water and in addition the net-like fabric allows the breathing of the skin and the movement of air, moisture, and warmth through the fabric during use;
wherein the common base structure is a seat shell wherein the net-like fabric is stretched over the seat shell, the seat shell having an at least partially closed portion on a side of the net-like fabric opposite the contact face such that the at least partially closed portion protects the net-like fabric and the person who is sitting on the vehicle seat from dirt and moisture;
wherein the net-like fabric is interconnected to a flexible rod by way of a fastening strap that is interconnected to the flexible rod such that the flexible rod is not directly interconnected to the net-like fabric, the flexible rod positioned in at least one guide channel incorporated in the seat part and the backrest, the fastening strap emerging out of the at least one guide channel through an opening extending along a longitudinal direction of the at least one guide channel; and wherein the opening of the at least one guide channel includes a gap width defined by two profiled elements that are separate elements from the common base structure.

2. The vehicle seat of claim 1, wherein the base structure is designed in the form of a seat shell of plastic material which is closed at least in part and which has one or more openings through which water is capable of flowing off.

3. The vehicle seat of claim 1, wherein the base structure comprises lateral elements which are spaced apart from one another by at least one spacer member.

4. The vehicle seat of claim 1, wherein the net-like fabric comprises natural fibers, such as wool, cotton, silk, rubber, or other similar materials, or the net-like fabric comprises organic or inorganic artificial fibers, such as polyester, polyamide, polyacrylonitrile, polyimide, polyethylene, polypropylene, polytetrafluoroethylene, polyurethane, aramide, glass fibers, basalt fibers, carbon fibers or other similar materials, or the net-like fabric comprises at least one metallic fiber, such as a metallic wire.

5. The vehicle seat of claim 1, wherein the flexible rod has a round cross-section.

6. The vehicle seat of claim 1, wherein the net-like fabric has zones in which it is more extensible in the longitudinal direction and/or in the width-wise direction than in other zones.

7. The vehicle seat of claim 1, wherein the base structure is designed in the form of a tube frame, wherein the tube frame is capable of being inserted into a seat shell, and wherein the tube frame comprises at least one of plastic material and metal.

8. The vehicle seat of claim 1, wherein the net-like fabric is a woven textile material.

9. The vehicle seat of claim 1, wherein the net-like fabric comprises knotted strands of fibers which form hexagonal intermediate spaces.

10. The vehicle seat of claim 1, wherein the at least partially closed section of the seat shell interconnects the backrest and the seat part, and wherein the at least partially closed section includes a bent portion.

11. The vehicle seat of claim 1, wherein the fastening strap and the net-like fabric are made of different materials.

12. The vehicle seat of claim 1, wherein the fastening strap is made of leather.

13. A vehicle seat for open or semi-open motorized recreational vehicles, such as riding mowers, golf carts, buggies or the like, comprising:
a seat part;
a backrest interconnected to the seat part in one piece a common base structure accepts a net-like fabric, which is formed as a contact face for a person who is sitting on the vehicle seat, the net-like fabric being stretched over the common base structure;
wherein the common base structure is designed in the form of a seat shell having a front brace member and an upper bounding brace member, the front brace member and the upper bounding brace member extending in a width-wise direction between lateral boundaries of the seat shell, wherein the seat shell protects a side of the net-like fabric facing away from contact face from dirt and moisture;
wherein the net-like fabric is weatherproof and is designed in such a way that it is more extensible in a longitudinal direction of the vehicle seat than in a width-wise direction of the vehicle seat;
wherein the net-like fabric lets through air and rain water and in addition the net-like fabric allows the breathing of the skin and the movement of air, moisture, and warmth through the fabric during use, the net-like fabric is joined at the edges to a flexible rod with a round cross-section, which is capable of being inserted into at least one guide channel arranged in the common base structure;
wherein the net-like fabric surrounds the flexible rod at least locally and emerges out of the at least one guide channel through an opening extending at least locally along the longitudinal direction of the at least one guide channel; and
wherein the opening includes a gap width defined by two profiled elements, which are separate elements from the common base structure.

14. The vehicle seat of claim 13, wherein the seat shell is comprised of plastic material.

15. A vehicle seat, comprising:
a seat part;
a backrest interconnected to the seat part in one piece common base structure that is the form of a tube frame that is adapted to be inserted into a seat shell;
a weatherproof net-like fabric stretched over the tube frame, the net-like fabric forming a contact face for a person who is sitting on the vehicle seat;
wherein the seat shell has a front brace member and an upper bounding brace member, the front brace member and the upper bounding brace member extending in a width-wise direction between lateral boundaries of the seat shell, wherein the seat shell protects a side of the net-like fabric facing away from contact face from dirt and moisture, the net-like fabric is joined at the edges to a flexible rod that is inserted into at least one guide channel arranged in the common base structure;
wherein the net-like fabric surrounds the flexible rod at least locally and emerges out of the at least one guide channel through an opening extending at least locally along the longitudinal direction of the at least one guide channel; and
wherein the opening includes a gap width defined by two profiled elements, which are separate elements from the common base structure.

16. The vehicle seat of claim 15, wherein the net-like fabric is interconnected to said flexible rod by way of a fastening strap.

17. The vehicle seat of claim 16, wherein the fastening strap and the net-like fabric are made of different materials.

18. The vehicle seat of claim 15, wherein the fastening strap is made of leather.

* * * * *

UNITED STATES PATENT AND TRADEMARK OFFICE
CERTIFICATE OF CORRECTION

| | |
|---|---|
| PATENT NO. | : 9,126,519 B2 |
| APPLICATION NO. | : 13/091825 |
| DATED | : September 8, 2015 |
| INVENTOR(S) | : Roland Uebelacker |

Page 1 of 1

It is certified that error appears in the above-identified patent and that said Letters Patent is hereby corrected as shown below:

On the title page, item 73, Assignee: delete "Grammar" and insert -- Grammer --

Signed and Sealed this
Fifth Day of April, 2016

Michelle K. Lee
*Director of the United States Patent and Trademark Office*